United States Patent [19]

van Herwijnen et al.

[11] 4,146,370
[45] Mar. 27, 1979

[54] PROCESS AND APPARATUS FOR THE PARTIAL COMBUSTION OF COAL POWDER

[75] Inventors: Teunis van Herwijnen; Cornelis J. Paul, both of Amsterdam, Netherlands

[73] Assignee: Shell Internationale Research Maatschappij B.V., The Hague, Netherlands

[21] Appl. No.: 745,176

[22] Filed: Nov. 26, 1976

[30] Foreign Application Priority Data

Dec. 4, 1975 [NL] Netherlands .................. 7514128

[51] Int. Cl.² ............................................. C10J 3/50
[52] U.S. Cl. ............................................. 48/210; 34/10;
   48/86 R; 48/202; 48/DIG. 4; 201/31; 302/55
[58] Field of Search .................. 48/77, 76, 73, 210,
   48/197 R, DIG. 4, 86 R, 202, 206; 23/288 S;
   201/31; 202/262; 110/28 J, 31; 122/4 D, 5;
   222/195; 302/53, 55, 59; 34/10, 57 A, 57 R

[56] References Cited

U.S. PATENT DOCUMENTS

| 2,557,680 | 6/1951 | Odell | 48/DIG. 4 |
|---|---|---|---|
| 2,623,815 | 12/1952 | Roetheli et al. | 48/73 |
| 3,380,780 | 4/1968 | Allen et al. | 302/53 |
| 3,884,649 | 5/1975 | Matthews | 48/206 |
| 3,994,701 | 11/1976 | Schweimanns | 48/86 R |
| 4,017,269 | 4/1977 | Dutz et al. | 48/197 R |

FOREIGN PATENT DOCUMENTS

| 1129887 | 5/1962 | Fed. Rep. of Germany. | |
| 1519210 | 3/1968 | France. | |
| 727382 | 3/1955 | United Kingdom | 48/210 |

Primary Examiner—S. Leon Bashore
Assistant Examiner—George C. Yeung

[57] ABSTRACT

A novel partial combustion process and apparatus therefor are disclosed wherein coal powder is passed from a fluidization vessel operated at high pressure to a gasification reactor operated at a substantially constant small pressure increment below the pressure of the fluidization vessel. Coal powder solids are introduced into the fluidization vessel through coal powder supply means while the fluidization gas is introduced into the fluidization vessel to fluidize the coal powder solids in the fluidization vessel. The fluidized powder is discharged through novel passage means in a direction perpendicular to the direction of flow of the fluidization gas flowing into the vessel, so that the fluidized coal powder is concentrated during flow and is uniformly dispersed, whereby the transfer rate of the coal powder is substantially increased, thereby making it possible to use smaller sizes of equipment for the same volumes handled.

4 Claims, 1 Drawing Figure

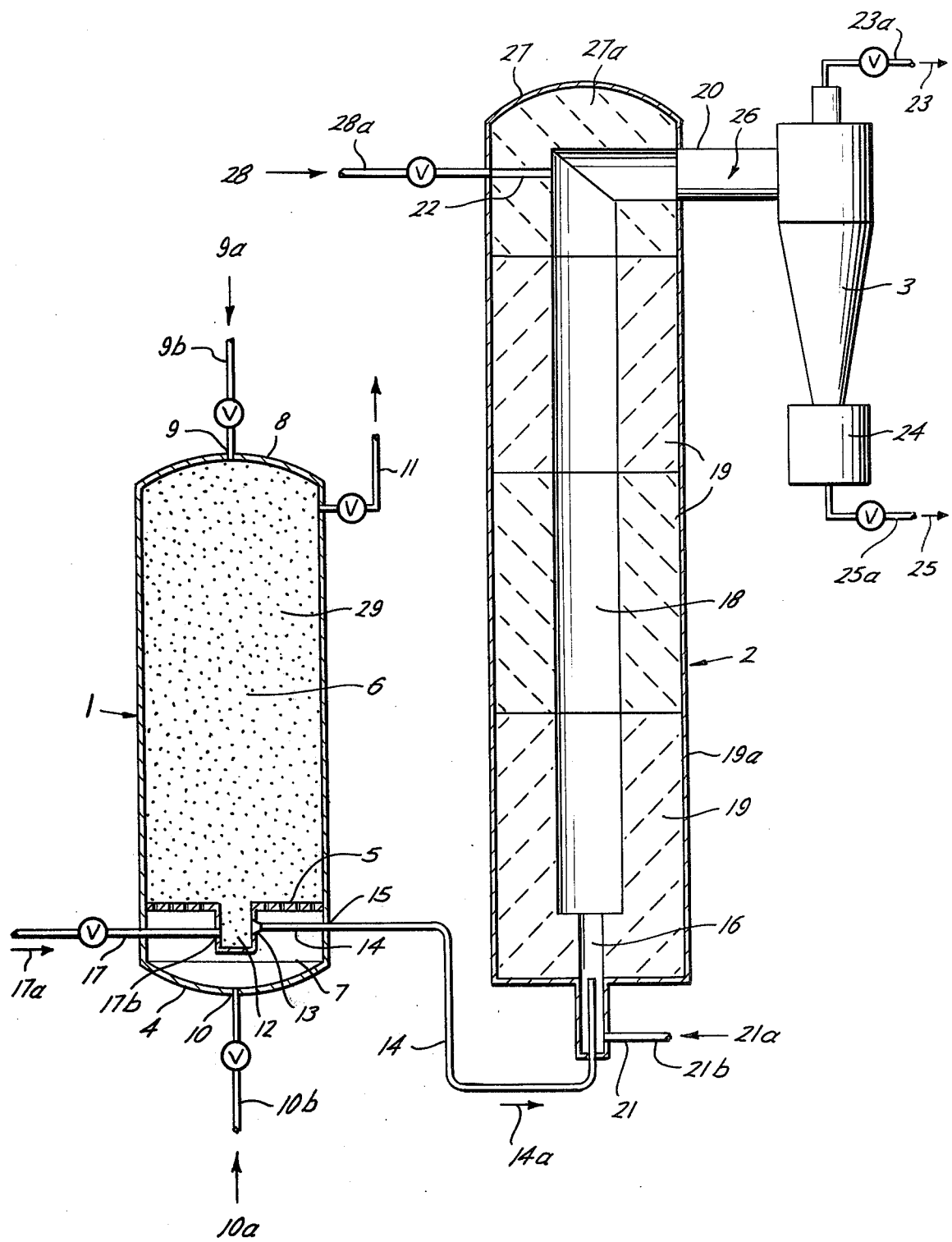

PROCESS AND APPARATUS FOR THE PARTIAL COMBUSTION OF COAL POWDER

BACKGROUND OF THE INVENTION

1. Field of the Invention

The invention relates to a process for the partial combustion of coal powder, and more specifically, a process wherein a dispersed coal powder is transferred from a fluidization vessel to a combustion reactor.

2. Description of the Prior Art

As will be appreciated by those skilled in the art, the term fluidization designates an expansion of a given amount of powder present in a space under the influence of a gas flowing through that space, which fluidization renders the powder free-flowing. Likewise, the term coal powder designates all finely divided solid fuels that are eligible for partial combustion, such as coal powder, finely divided brown coal, wood dust, etc. Partial combustion is understood to be the combustion of fuel with a smaller amount of oxygen than would be required stoichiometrically for a complete combustion to $CO_2$ and $H_2O$. In addition to oxygen (or air), steam is often introduced into the reactor for partial combustion reactions and is partly converted into hydrogen.

In the partial combustion of solid fuel, preference is usually given to powder, especially coal powder, because of its rapid gasification. The coal powder preference applies both to (1) direct combustion gasification processes, or processes in which the powder and the oxygen are both injected into a reactor to form a flame therein; and to (2) indirect combustion gasification processes, or processes in which the fuel is first gasified at a lower temperature in a fluidized bed or fluidization vessel with the aid of a hot fluidization gas and is subsequently partially combusted in a reactor. In the former type of processes, the pressure in the combustion reactor may unfortunately fluctuate widely as compared to the latter type of processes, which produces numerous instabilities and inefficiencies in the partial combustion process known to those skilled in the art.

In both methods, it is advantageous to carry out the partial combustion at elevated pressure, e.g. at 30 atm or higher. The gasification equipment is then more compact and the product gases become available under high pressure.

According to the indirect method, to which this application usually pertains, the coal powder solids are conveyed from the fluidization vessel to the combustion reactor by passage means while dispersed in a gas, so that theoretically a flow of finely divided coal powder enters the combustion reactor, which is very advantageous for the combustion process proper. In most cases the oxygen-containing and combustion-supporting gas can only be contacted with the coal powder in or near the combustion reactor, because of the ignition hazard outside the reactor. For this reason the fluidization gas used is often an inert gas or at any rate a gas containing little or no oxygen, such as steam, nitrogen, carbon dioxide or product gas.

It was realized by some of those skilled in the art that it would be desirable not only to pressurize the coal powder prior to its introduction into the combustion reactor in a separate fluidization vessel, but (1) to have the pressure in the fluidization vessel be only the smallest increment above that pressure prevailing in the combustion reactor to transfer the dispersed powder to the reactor, and (2) to keep this small necessary increment substantially constant. Hence, even a greater stability in the partial combustion process would occur. If that obstacle would be overcome, it would not be necessary for a process operator to overcome at the same time both (a) a great pressure difference and (b) a great temperature difference between the fluidization vessel and the reactor when the coal powder was introduced into the combustion reactor.

In the past, in attempts to accomplish these objectives, efforts were made by those skilled in the art to discharge the dispersed coal powder from the fluidization vessel in a simple way and with a sufficiently high concentration of solids in the gas, but unfortunately, were not entirely successful. One difficulty was that at the place where coal particles were discharged from the fluidization vessel, the fluidized bed in the fluidization vessel was disturbed so much and obstructed by parts of discharge means in the vessel for flow of the dispersed coal solids to the reactor that the degree of solids loading of the exit gas was low. Still another difficulty was that the vessel discharge dispersions or concentration of particles in any short length of time remained inhomogeneous and irregular. Because of these two disadvantages a relatively larger amount of inert gas was introduced into the combustion reactor than that desired, which resulted occasionally in reactor temperatures becoming too low for effective conversion, and a need for larger size reactors. Also, with inhomogeneous and irregular concentrations of solids in the dispersed coal powder, numerous inefficiencies and instabilities occurred in the reactor known to those skilled in the art.

A method was needed to obviate these drawbacks and provide a process for efficiently discharging the coal powder from the fluidization vessel.

SUMMARY OF THE INVENTION

According to the broad aspects of this invention, the objective of maintaining a very small and substantially constant pressure differential between the fluidization vessel and the reactor, and the difficulties of (a) low concentrated flow rates of coal powder to the combustion reactor, (b) relatively large flow rates of inert gas to the combustion reactor, and (c) inhomogeneous and irregular discharge dispersions of coal particles can be avoided for processes wherein coal powder solids are passed into the fluidization vessel and fluidization gas is also passed into the vessel to fluidize the coal powder solids in the vessels by a novel method and apparatus wherein novel passage means through which the fluidized coal is discharged are employed for flow of the fluidized coal powder in a direction that is substantially perpendicular to the direction of flow of the fluidization gas into the fluidization vessel.

Surprisingly, it has been found that in utilizing the process and apparatus disclosed herein that the passage means for the coal powder from the fluidization vessel does not obstruct the fluidized bed in the fluidization vessel, especially in the immediate vicinity of the point where the coal powder is withdrawn or discharged from the fluidized bed. A concentrated and uniform flow of coal powder through the passage means to the combustion reactor is thus possible without inhomogeneous and irregular dispersions.

DESCRIPTION OF THE PREFERRED EMBODIMENTS

This invention pertains to any process wherein coal powder solids are passed into the fluidization vessel and fluidization gas is also passed into vessel to fluidize the coal powder solids in the vessel, and has particular application to the indirect combustion-gasification method mentioned above. Here the fluidization vessel usually contains a porous plate which is substantially flat and divides the vessel into two compartments. This plate should be permeable to gas, but should not allow passage to the coal powder. The coal powder is introduced into a first compartment by coal powder supply pipe means. The fluidization gas is introduced into a second compartment having a substantially uniform direction of flow by fluidization gas supply means. Preferably the first compartment is higher than the second to utilize gravity for the coal powder entering the vessel. The porous plate then ensures a proper distribution of the fluidization gas over the entire cross-section of the fluidization vessel in the first compartment, where the coal powder is fluidized into a fluidized bed. The coal powder is discharged from the first compartment while dispersed in gas and passed to the combustion reactor. Surplus fluidization gas is usually discharged separately from the first compartment.

According to a preferred embodiment of the instant invention for the indirect combustion-gasification method mentioned above, the coal powder is discharged from the fluidization vessel in a direction substantially parallel to the porous plate through passage means which are in or in a slightly remote plane than the plane of the porous plate, and more preferably are discharged through passage means comprising (1) nozzle means from a "compartment with the porous plate" and (2) a straight section of linking means leading out of the fluidization vessel to the reactor. Preferably the nozzle means are near or entirely under the porous plate.

By "compartment with the porous plate" it is meant a compartment associated with the porous plate exposed to the first compartment, and abutting into the second compartment. Preferably, said compartment is not porous, and said "compartment with the porous plate" should be constructed of such materials as to (1) fit in sealing engagement with the porous plate and (2) to maintain the integrity of the first and second compartments, i.e., to prevent coal particles from entering the second compartment.

As the nozzle means are preferably in or is in a slightly remote plane than the porous plate, the coal powder is thus discharged from the fluidized bed at a place where the action of the fluidization gas is at maximum. Furthermore, the means for discharging the coal powder from the fluidized bed are relatively easy to install near the porous plate and there are no obstacles in the fluidized bed. By "discharge means" as employed herein, it is meant the means comprising the combined compartment with the porous plate, nozzle means, and carrier gas pipe means, if any, as defined below. It is preferred that the axis of the compartment with the porous plate be substantially aligned with the direction of flow of the fluidized gas. It is preferred that the fluidization vessel be a conventional cylindrical unit, and most preferably erected such that it has its axis substantially normal to grade. Another preferred embodiment is to have the porous plate coaxial with the fluidization vessel. It is also preferred that the fluidization gas enter the second compartment having an axis substantially parallel to the axis of the fluidization vessel, more preferably coaxial with the axis of the fluidization vessel. It is also preferred that the axis of the compartment with the porous plate be aligned with the axis of the fluidization vessel, and most preferred that the fluidization vessel, direction of flow of the fluidization gas, and compartment with the porous plate all be coaxial.

It is likewise preferred that the compartment with the porous plate be cylindrical, and be substantially coaxial with the fluidization vessel, and much preferred that cylindrical compartment of the porous plate be coaxial also with the direction of flow of the fluidization gas. Likewise and preferably, the ratio of the diameter of the compartment with the porous plate to the diameter of the fluidization vessel should be about from 0.05 to about 0.25. The axis of the nozzle, required to be substantially perpendicular to the direction of flow of the fluidization gas, is most preferably perpendicular to the fluidization vessel, porous plate, and direction of flow of the fluidized gas.

Still another preferred embodiment according to the invention is to discharge the coal powder via the passage means with the aid of a flow of a carrier gas which is passed by carrier gas pipe means with said compartment with the porous plate in a direction that is substantially coaxial with the passage means and that direction in which the coal powder is discharged through the nozzle means. Such a flow of carrier gas has a certain ejector effect and thus accelerates the coal particles to be discharged, and surprisingly does not affect uniform flow of the coal powder.

It is found that the amount of coal powder solids discharged through the passage means per unit time can be controlled by controlling the quantity of carrier gas per unit time flowing to the fluidization vessel. Thus the supply of coal powder to the reactor becomes much easier to control. A linking means, preferably a pipe means or tube means, connects the nozzle means of the fluidization vessel and the combustion reactor for flow of the dispersed powder to the reactor. A first portion of the linking means beginning with the nozzle means and ending no sooner than the wall of the fluidization vessel should be substantially straight and substantially perpendicular to the direction of flow of the fluidization gas. The remainder of the linking means with said nozzle means for discharging the flow of gas carrying dispersed coal particles from the fluidization vessel may, preferably, be kept outside the actual fluidization vessel and hence will not disturb the fluidized bed in the first compartment. Since the flow of carrier gas prior to reaching the nozzle has little, if any, velocity component in the direction of flow of the fluidized gas, the fluidized bed is substantially not disturbed. Moreover, if the carrier gas pipe means are substantially coaxial with the nozzle means as indicated above, as a result of the ejector effect, fluidized coal particles are attracted and sucked into the nozzle means, so that a preferably flow of very evenly dispersed coal particles is obtained in the pipe means with the nozzle means in which the flow of carrier gas is passed from the fluidization vessel to the combustion reactor.

By adjusting any or all of the variables of (1) the pressure difference or increment between the combustion reactor and the fluidization vessel, (2) the rate of flow of the fluidization gas in the fluidization vessel, or (3) the rate of flow of the carrier gas, the amount of coal discharged from the fluidization vessel and received by the reactor can be accurately varied and predetermined.

Another unexpected advantage of the process according to the instant invention, especially when the carrier gas pipe means is substantially coaxial with the nozzle means, is that the coal powder throughput is less dependent on momentary pressure differences between the fluidization vessel and the combustion reactor than if the coal powder were passed through at a low velocity without a carrier gas.

As stated, one method of controlling the feeding of coal powder from the fluidization vessel to the reactor is controlling the pressure differences between the vessel and the reactor. Because of the large contents of such vessels such automatic control, however, is slow. According to the instant invention, the amount of carrier gas is preferably controlled based upon the measurement of the amount of coal powder flowing to the gasification reactor. This so-called feed-back control has become possible by reason of the use of a flow of carrier gas with the coal-powder throughput. Still another advantage of employing carrier gas is that a small and substantially constant pressure difference between the fluidization vessel and the reactor can be maintained independent of control from coal-powder throughput, which is difficult to measure.

According to the invention the velocity of the fluidized gas stream at the nozzle is preferably from about 3 to about 50 meters per second (m/s). In most cases, the velocity is thereby high enough to entrain the coal particles, but not so high that the mechanical properties of the apparatus are becoming a serious impediment. Most preferably, the velocity will in actual practice be between about 10 and about 30 m/s.

The dimensioning of the nozzle means, consisting preferably of one or more conventional nozzles by which the coal powder is passed from the vessel, is important for a desirably homogeneous dispersion of the coal powder in the gas. It is recognized by those skilled in the art that carbon powder, even if dispersed, has poor flow or viscosity characteristics. This problem is overcome if the fluidized coal powder is passed to said nozzle means via a compartment with the porous plate as described above that is connected to the nozzle means and wherein the residence time of the fluidized coal powder is preferably less than about 250 milliseconds, and most preferably smaller than 100 milliseconds. The carbon powder is thereby prevented from consolidating in the nozzle means, whereby an inhomogeneous dispersion of coal powder in gas and ultimately a blocking of the nozzle passageway might occur.

In a preferred embodiment of this invention, the flow of carrier gas is passed to the nozzle means via the carrier gas pipe means represented by a thin tube wherein the flow rate of carrier gas is high. This thin tube is preferably coaxial with the nozzle means and may lie in the extension of the axis of the nozzle means and end at a short distance before the nozzle means. Hence, between the end of the thin tube and the nozzle means (in the compartment with the porous plate) the carrier gas traverses a short distance through the fluidized bed of coal particles. Thus, a superior ejector effect is achieved and a considerable amount of coal particles is entrained by the carrier gas.

While both the fluidization vessel and the combustion reactor are at high pressure, it is preferred to maintain a substantially constant pressure difference between the pressure of the fluidization vessel ($P_{fv}$) and the pressure of the combustion reactor ($P_{ar}$). This pressure difference ($|P_{fv} - P_{ar}|$) is preferably great in comparison with the pressure fluctuations in the combustion reactor, in order to minimize the influence of these reactor pressure fluctuations on the quantity of coal powder passed through per unit time, which quantity can be controlled preferably with the flow rate of carrier gas.

The carrier gas may be the same or a similar gas as the fluidization gas. In principle the carrier gas may have any composition, provided that it does not contain enough oxygen so that ignition will occur. Before being introduced into the nozzle means, the pressure of the carrier gas should be transformed by mechanical means, such as a compressor, into a pressure such that the flow rate of carrier gas is the desired rate of flow.

The instant invention also relates to an apparatus for the partial combustion of coal powder, comprising a fluidization vessel and a combustion reactor and passage means through which the fluidized coal is discharged for flow of said fluidized coal in a direction substantially perpendicular to the direction of flow of the fluidization gas into the fluidization vessel.

According to the invention the said passage means preferably comprise (1) at least one nozzle means with a compartment with the porous plate and (2) a straight section of linking means leading out of the fluidization vessel to the reactor and with the nozzle means through which the dispersed powder can pass from said nozzle means in a direction substantially perpendicular to the direction of flow of the fluidization gas. Again, it is preferred that the fluidization vessel be a conventional cylindrical unit, and most preferably erected such that it has its axis substantially normal to grade. It is also preferred to have the porous plate coaxial with the fluidization vessel. It is likewise preferred that the fluidization gas enter as a stream into the second department having an axis substantially parallel to the axis of the fluidization vessel, and most preferably being coaxial with the axis of the fluidization vessel. Most preferably, the fluidization gas enters the cylindrical vessel as a stream having a vector with substantially no component along the plane normal to the axis of the vessel. Another preferred embodiment is to align the axis of the compartment with the porous plate with the axis of the fluidization vessel. It is most preferred that the fluidization vessel, direction of flow of the fluidization gas, and compartment with the porous plate all be coaxial. It is preferred that the compartment with the porous plate be cylindrical, and be substantially coaxial with the fluidization vessel. It is most preferred that the cylindrical compartment of the porous plate be also coaxial with the direction of flow of the fluidization gas. Likewise and most preferably, the ratio of the diameter of the compartment with the porous plate to the diameter of the fluidization vessel should be about from 0.05 to about 0.25. Accordingly, the axis of the nozzle, required to be substantially perpendicular to the direction of flow of the fluidization gas is, most preferably, perpendicular to the fluidization vessel, porous plate, and direction of flow of the fluidized gas.

The invention will be further elucidated hereinafter with the aid of a FIGURE of the process and apparatus of this invention. This FIGURE is but an example and is a diagrammatic representation of an apparatus for the partial combustion of coal powder, for which departures can be made by those skilled in the art within the scope of this invention as defined by the principles enunciated above.

The FIGURE shows fluidization vessel 1, as well as a combustion reactor 2, with cyclone 3 for the separation of soot and ash from the product gas.

In cylindrical fluidization vessel 1 there is at some distance above fluidization vessel bottom 4 a coaxial horizontal porous plate 5, which extends over the entire diameter of the vessel and divides the vessel into a first compartment 6 for the fluidization of coal powder and a second compartment 7 for the supply and distribution of the fluidization gas over the entire diameter of vessel 1 via porous plate 5. In cover 8 of vessel 1 there is an inlet 9 for the supply of coal powder by coal powder supply stream 9a through coal powder supply means 9b, and in fluidization vessel bottom 4 of vessel 1 there is also an inlet 10 for the supply of a fluidization gas via fluidization gas stream 10a through fluidization gas supply means 10b, which means are oriented such that the fluidization gas stream enters in a direction substantially coaxial with the vessel. Vessel outlet 11 for the excess fluidization gas is to be found in cover 8 of vessel 1.

Directly underneath porous plate 5 there is a compartment 12 with the porous plate 5 coaxial with the vessel that is open at the top of the compartment. This porous plate allows the passage of the fluidized gas of fluidized gas stream 10a into the first compartment to fluidize the falling coal particles into a fluidized bed 29, while not allowing the particles to pass into the second compartment. In the side wall of the compartment 12 with the porous plate 5 a nozzle means 13 represented by a single nozzle has been fitted in sealing engagement with compartment 12 with plate 5 and is connected to a linking means 14 represented by pipe means mounted in the fluidization vessel under porous plate 5. Nozzle means 13 and the first section of pipe means 14 from the nozzle means 13 to fluidization vessel outlet 15 constitute a passage means and have axes substantially perpendicular to the direction of flow of the fluidization gas stream 10a and also perpendicular to axes of the vessel 1, porous plate 5, and compartment with the porous plate 12. The fluidized coal powder flows as stream 14a from the fluidization vessel 1 to reactor 2. The pipe means 14 (and stream 14a within) pass through the wall of vessel 1 at outlet 15 and after various curves lead to a burner means 16 in the bottom of combustion reactor 2. Diametrically opposite nozzle means 13 an inert gas carrier pipe means represented by a tube 17 transport a supply of inert carrier gas in inert carrier gas stream 17a through carrier pipe means inlet 17b into the compartment 12 with the porous plate 5.

Combustion reactor 2 has within it a vertical, relatively long cylindrical reactor cavity 18 traversing a substantial portion of reactor 2, and is bounded by conventional refractory lining 19 around bottom and side reactor wall 19a and a reactor cap 27 with refractory lining 27a in the top of reactor 2. Burner means 16 is coaxial with the reactor and is further equipped with an air inlet 21 which contains enough oxygen per oxygen-containing stream 21a such that stream 14a when combined with stream 21a is ignitable. Reactor effluent pipe means 26 links reactor 2 and cyclone 3 and encloses a cooling zone cavity 20. The cavity 20 communicates with steam inlet 22, which is a cavity located in reactor cap 27 through which steam of low pressure in steam stream 28 enters through steam supply means 28a and passes into cooling zone cavity 20. The cyclone 3 disposes of materials passing through it from reactor effluent pipe means through (a) product gas delivering pipe means 23a, a product gas outlet stream 23, and through (b) ash discharge pipe means 25a an ash discharging stream 25 that communicates with ash space 24 within cyclone 3.

OPERATION

The apparatus depicted operates as follows: coal powder is introduced through coal powder supply stream 9a into vessel 1 via inlet 9 and is fluidized with the aid of fluidization gas stream 10a via inlet 10 to form a fluidized bed 29 in the first compartment 6 and in the compartment 12 with the porous plate 5. From compartment 12 with plate 5, which is in communication with fluidized bed 29, coal particles are conveyed at a high velocity to reactor 2 through the passage means which preferably includes the nozzle means 13 and a first portion of the pipe means 14 from nozzle means 13 to outlet 15. A flow of carrier gas in stream 17a may be provided to accelerate the flow of coal particles through nozzle means 13 and pipe means 14. In reactor 2 the fluidized coal particles from burner 16 are mixed with the combustion air from stream 21a and, while reacting almost simultaneously, move upwardly with it. After a certain residence time, in which gasification of the coal particles has been effected, the hot reaction mixture enters cooling zone 20. By mixing with steam, cooling of the hot mixture is effected in zone 20. In the cyclone 3, the ash and soot are subsequently removed from the product gas outlet stream 23 in ash discharging stream 25.

The invention will hereinafter be illustrated with the aid of three examples.

EXAMPLE I

Referring to FIG. 1 in a vertically placed cylindrical fluidization vessel 1 with a diameter of 150 mm, a porous plate 5 of sintered metal was installed in a horizontal position near the bottom 4 of the vessel. In the center of this plate there was a cylindrical compartment 12 with the porous plate 5 with a diameter of 10 mm and a depth of 21 mm. In this compartment at a depth of 13 mm, in a plane parallel to the sintered plate and diametrically opposite each other, there were (1) a carrier gas inlet 17b connected to a carrier gas stream 17a by tube means 17 and (2) a nozzle 13 with a diameter of 5 mm. The nozzle 13 was connected via a 10 mm long connecting piece to a linking means represented by a tube 14 having a diameter of 3.9 mm, which tube narrowed over a distance of 4.7 m to a diameter of 2.5 mm.

With the aid of fluidization gas stream 10a nitrogen supplied under the sintered porous plate 5, a stream of powdered coal 9a, of which 15 volume percent was larger than 90 $\mu$m, was fluidized in the space above the plate, or first compartment 6. Application of a flow of an inert carrier gas stream 17a of 800 Nl/h and a pressure drop across the 4.7 meter tube 14 from 2.1 atmospheres absolute (atm abs) to 1.0 atm absolute produced a remarkably steady flow of fluidized coal powder 14a of 2.2 kg/h with a density of 2.7 kg coal/m$^3$ gas, measured at the end of the tube.

EXAMPLE II

In a variation of Example I utilizing the same flow rates and equipment above, except as described herein, a tube 14, 4 meters long and 5 mm in diameter was installed, and, at a small inert carrier gas stream 17a of 100 Nl/h and a pressure drop across the 4 meter tube 14 from 2.0 atm abs to 1.0 atm abs, a fluidized coal stream 14a of 155 kg/h coal was obtained with a load of 130 kg/m$^3$ inert gas, measured at the end of the tube.

EXAMPLE III

Referring partially again to the FIGURE, in this example use was made of a cylindrical bunker 1a with a diameter of 3 meters, having a truncated conical bottom 4 of the bunker with an enclosed angle of 60° and a smallest diameter at the bottom 4 of the bunker of 0.5 m. At the bottom 4 of the bunker 1a there was a horizontal sintered porous metal plate 5 that separates the bunker from a small cylindrical vessel 1b located under the plate 5, into which vessel a fluidization gas stream 10a was introduced. In the center of this metal plate 5 there was a cylindrical compartment 12 with the plate 5 with a diameter of 120 mm and a depth of 125 mm. The upper rim of the cylindrical compartment extended 25 mm above the top of the sintered plate. Bunker 1a and small vessel 1b together form fluidization vessel 1.

In the cylindrical compartment 12, at a depth of 75 mm below the upper edge and diametrically opposite each other, there were (1) a carrier gas inlet 17b with a diameter of 10 mm and (2) a nozzle 13 with a diameter of 55 mm. The imaginary lines that connected to these two openings were co-axial. The nozzle 13 connected to linking means was represented by a tube 14 which was initially 55 mm in diameter and gradually narrowed to 35 mm in diameter.

Above the sintered plate a coal powder stream 19a, of which 15 volume percent is larger than 90 $\mu$m, entered through a tube 9b and was fluidized in the compartment 6 above the plate 5 into a fluidized bed 29 by means of a nitrogen fluidization gas stream 10a entering bottom 4 of small vessel 1b by a small tube 10b, and having a pressure of 20 atm absolute. At an inert carrier gas flow of 56 $Nm^3$/h and a pressure drop across the 2 meter tube 14 of 2.0 atm absolute, a constant steady flow rate of fluidized coal powder 14a was obtained, the flow rate of coal being about 9.7 tons per hour, nitrogen load of 580 kg/$m^3$ gas, measured at the inlet of the tube 14 at the nozzle 13.

EXAMPLE IV

Referring partially again to the FIGURE, in this example a nozzle 13 in the fluidization vessel 1 was connected to a 6 m long pipe 14 of approximately 35 mm diameter. A coal powder stream 14a flowing from the vessel to a reactor 2 utilizing the equipment mentioned in Example III was controlled by automatic regulation of the so-called set-point of the carrier-gas flow-control through a measurement of the coal-powder throughput.

When a constant throughput 14a of 20 tons of coal powder per hour with an average pressure drop of 5.0 atm was desired through the line 14 between the vessel 1 and the reactor 2, it was found that fluctuations in pressure drop between 4.5 and 5.5 atm that otherwise might have disturbed the throughput could be compensated with an inert carrier gas stream 17a flowrate between 37 and 243 $Nm^3$ per hour. The coal powder load at the nozzle 13 thereby would fluctuate between 497 and 660 kg/$m^3$ gas. The pressure in the fluidization vessel 1 meanwhile stayed at 20 atm.

We claim as our invention:

1. In an improved method for the partial combustion of coal powder solids, comprising passing coal powder solids into a fluidization vessel; then flowing fluidization gas into the fluidization vessel to fluidize the coal powder solids in the fluidization vessel, passing the coal powder solids while dispersed in the fluidization gas from the fluidization vessel to a combustion reactor, and partially combusting the coal powder solids in the combustion reactor, wherein:

(1) the fluidization vessel contains a porous plate dividing the vessel into first and second compartments and is permeable to a fluidization gas but not to the coal powder,
   (2) the coal powder is introduced into the first compartment and the fluidization gas into the second compartment whereby said gas passes through the porous plate and fluidizes and pressurizes the powder in the first compartment, and
   (3) the fluidized coal powder is conveyed from the fluidization vessel to the combustion reactor by linking means, the improvement comprising the steps of:

passing the fluidized coal powder into a compartment with the porous plate which fits in sealing engagement with the porous plate and which maintains the integrity of the first and second compartments; and discharging said dispersed coal powder from the fluidization vessel by passage means via the compartment at a pressure greater than in the combustion reactor and in a direction substantially perpendicular to the direction of flow of the fluidization gas flowing into the fluidization vessel.

2. The method as recited in claim 1, wherein the passage means comprise nozzle means with the porous plate and a first portion of the linking means beginning with the nozzle means and ending no sooner than the wall of the fluidization vessel.

3. The method as recited in claim 2, wherein the nozzle means is oriented in such a direction that the discharge of the coal powder is substantially parallel to the porous plate and substantially perpendicular to the direction of flow of the fluidization gas.

4. The method as recited in claim 2, wherein the dispersed coal powder is discharged into the nozzle means with the aid of a carrier gas stream which is passed into said passage means by carrier gas pipe means with said compartment with the porous plate, in a direction that is substantially coaxial with the direction in which the dispersed coal powder is discharged into passage means.

* * * * *